United States Patent
Hon et al.

(10) Patent No.: US 7,231,526 B2
(45) Date of Patent: Jun. 12, 2007

(54) SYSTEM AND METHOD FOR VALIDATING A NETWORK SESSION

(75) Inventors: Henry Hon, Berkeley, CA (US); Fred Cheng, Berkeley, CA (US)

(73) Assignee: Authenex, Inc., Hayward, CA (US)

( * ) Notice: Subject to any disclaimer, the term of this patent is extended or adjusted under 35 U.S.C. 154(b) by 780 days.

(21) Appl. No.: 10/280,590

(22) Filed: Oct. 25, 2002

(65) Prior Publication Data

US 2003/0084304 A1 May 1, 2003

Related U.S. Application Data

(60) Provisional application No. 60/347,581, filed on Oct. 26, 2001.

(51) Int. Cl.
*H04K 1/00* (2006.01)
*H04L 9/00* (2006.01)

(52) U.S. Cl. ............... 713/185; 713/182; 713/166; 713/168; 726/2; 726/9; 705/65; 705/69; 380/44; 380/262; 380/277; 380/281

(58) Field of Classification Search ............... 713/185
See application file for complete search history.

(56) References Cited

U.S. PATENT DOCUMENTS

| | | | | |
|---|---|---|---|---|
| 6,317,829 B1 * | 11/2001 | Van Oorschot | ............. | 713/155 |
| 6,351,813 B1 * | 2/2002 | Mooney et al. | ............. | 713/185 |
| 6,490,687 B1 * | 12/2002 | Nagai | ............................ | 726/9 |
| 6,810,479 B1 * | 10/2004 | Barlow et al. | ............. | 713/185 |
| 6,895,502 B1 * | 5/2005 | Fraser | ........................ | 713/168 |
| 6,981,152 B2 * | 12/2005 | Du et al. | .................... | 713/193 |
| 2003/0081774 A1 * | 5/2003 | Lin et al. | ...................... | 380/44 |

* cited by examiner

*Primary Examiner*—Emmanuel L. Moise
*Assistant Examiner*—Shewaye Gelagay
(74) *Attorney, Agent, or Firm*—Jeffrey P. Aiello; GSS Law Group

(57) ABSTRACT

A system and method for preventing interception and decryption of information by an unauthorized party when that information is transmitted over a network is provided. A token is used to encrypt one-time password that is different for each network session, to prevent decryption thereof. The encrypted one-time password is returned to a network server for authentication by the server. The network server generates its response in a similar fashion. The server compares its response to the one-time password, to determine if they match. If they match, then the client is granted access to the network. If they responses do not match, then the client is denied access to the network by the server.

7 Claims, 2 Drawing Sheets

SYSTEM AND METHOD FOR VALIDATING A NETWORK SESSION

CROSS-REFERENCE TO RELATED APPLICATIONS

This Application is a non-provisional application of Provisional Application No. 60/347,581, filed on Oct. 26, 2001.

BACKGROUND OF THE INVENTION

1. Field of the Invention

The present invention relates generally to data encryption and decryption systems and methods and, more particularly, to a system and method for preventing interception and decryption of information by an unauthorized party when that information is transmitted over a network.

2. Background Information

A computer network session is the time during which two computers in a network maintain a connection. In an interactive computer program running on the network, a network session can be considered the time during which one computer, such as a server, accepts, processes, and outputs information from another computer, such as a client. Programs designed for contacting different servers on the Internet are commonly known as "web applications" or "web browsers".

During a network session, a user, or client, accesses a remotely located computer, or server, to exchange data with the server via a computer network, such as the Internet or an Intranet, for example. During the network session the client may further exchange data with a second client via the server and may exchange data with one or more additional servers.

Frequently, confidential data is exchanged between the client and server during a network session and this data may be valuable to outside parties. Such confidential data may include personal information, financial information, and proprietary information, for example. Thus, if an unauthorized party were to obtain a client's confidential information they could use that information however they desire.

The processes of data encryption and decryption are well known for inhibiting unauthorized access to confidential data. Data encryption is the process of encoding data to prevent unauthorized access to the data, especially during transmission. Encryption of data is usually based on an encryption/decryption key, or key, that may comprise a predetermined sequence of data, that is essential for decoding the data. The encryption key is used to encrypt the data prior to transmission. The intended recipient of the data is provided with a like key for decrypting the data, to allow access to the data by the intended recipient.

One common method of data encryption/decryption is "Public Key Encryption". Public key encryption comprises an asymmetric scheme that uses a pair of keys for encryption. A public key is one of two keys in public key encryption. A user releases the public key to the public. The public uses the public key for encrypting data this is sent to the user and for decrypting the user's digital signature. A private key is the other of the two keys in public key encryption. The user keeps the private key secret and uses it to encrypt digital signatures and to decrypt received messages. A disadvantage of public key encryption is that it may be vulnerable to "Man-In-The-Middle" (MITM) attacks, since the client and server are unable to verify the identity of each other.

A Man-In-The-Middle (MITM) attack typically involves an interceptor posing as a target, which may be a sever, for example. The interceptor uses its own public key, instead of the target's public key, for asymmetric encryption. This allows the interceptor to decrypt confidential data that is intended for the target. The interceptor can then use this decrypted information to gain unauthorized access to the target's confidential information.

A known attempt to defend against MITM attacks is, to ensure that the public key is coming from its legitimate owner. To ensure that a public key is coming from its legitimate owner, an encrypted link can be created between a server, such as a web server on the Internet, and web browser software. Secure Sockets Layer (SSL) is a security technology standard for creating encrypted links between web servers and browsers. This encrypted link attempts to ensure that data transmitted between the web server and browser remains private and integral. SSL technology requires the use of an electronic certificate, issued by a trusted Certification Authorities (CA), to be used to generate the encrypted link. The electronic certificate is an electronic document that binds some pieces of information together, such as a user's identity and their public key. The pieces of information are bound by the signature of the CA.

A trusted Certification Authority (CA) is a trusted third party responsible for issuing digital certificates and managing them throughout their lifetime. Digital certificates are electronic files containing the user's public key and specific identifying information about the user.

Digital signatures are also used to defend against MITM and other attacks. With digital signatures, a sender uses a secret key to create a unique electronic number. This unique electronic number can be read by anyone possessing the corresponding public key, which verifies that the message is truly from the sender.

Another known method of attempting unauthorized access to encrypted data is a "replay" attack. Web browsers may be vulnerable to a replay attacks, if a user's authentication tokens are captured or intercepted by an attacker. In a replay attack, an attacker directly uses authentication tokens, such as a session ID in a URL cookie, for example. For clarification, "URL" is an acronym for Uniform Resource Locator. A URL is an address for a resource on the Internet used by Web browsers to locate Internet resources. The attacker uses the authentication token to obtain or create service to a user's account, while bypassing normal user authentication, such as logging in with the appropriate username or password.

For example, an attacker discovers a URL that contains session ID information. With this information, the attacker may be able to obtain or create service to user's account contained in the session ID information, simply by pasting that URL back into the internet address widow of their web browser. The legitimate user may not need to be logged into the application at the time of the replay attack.

BRIEF SUMMARY OF THE INVENTION

The present invention provides a system and method for preventing interception and decryption of information by an unauthorized party when that information is transmitted over a network. The present invention uses more than one round of data encryption and a symmetric shared secret to prevent decryption of information intended for an authorized party. A one-time password, that is generated through encryption of an identifier code which is unique for each network session, inhibits against "Man-In-The-Middle" (MITM), "replay", and other attacks.

A unique token device, or token, of the present invention may include a processor running a data encryption/decryption program and a memory device for storing data. Symmetric shared secrets are embedded in the memory device. This eliminates the need for key exchanges between two parties, and thus, inhibits MITM from stealing encryption/decryption keys.

When a client requests access to a network server, to activate a web page stored on the server, for example, the client first couples their token to a computer. The invented method queries the server to generate a challenge. The challenge may include a challenge puzzle, an encryption/decryption key ID, and a network identifier code, also referred to in the art as session ID code. The challenge may be in the form of a 128-bit number.

The token receives the challenge and processes it. The challenge is decomposed to recover the challenge puzzle, key ID, and network identifier code. The challenge puzzle and key ID determine which two particular shared secrets stored in the token's memory device are to be sent to the token's processor.

The token's processor, may be running a data encryption/decryption algorithm, such as an Advanced Encryption Standard (AES) technology type data encryption/decryption algorithm. The two shared secrets are fed into the data encryption/decryption algorithm to generate an encrypted puzzle key. The network identifier code and encrypted puzzle key are then fed into the data encryption/decryption algorithm to generate the encrypted response, or one-time password (OTP). Since the OTP is used only once, replay attacks are prevented.

The OTP is sent to the network server. Once the server receives the OTP, the server generates its response using the same process that the token used to generate the OTP. The server then compares its response to the OTP to see if they match. If they match, the client is granted access to the network and if they do not match, the client is denied access to the network.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

The present invention provides a system and method for preventing interception and decryption of information by an unauthorized party when that information is transmitted over a network. The present invention uses more than one round of data encryption and a symmetric shared secret to generate a one-time password. Since the one-time password is used only once, replay attacks and other attacks may be prevented.

Figure 1:
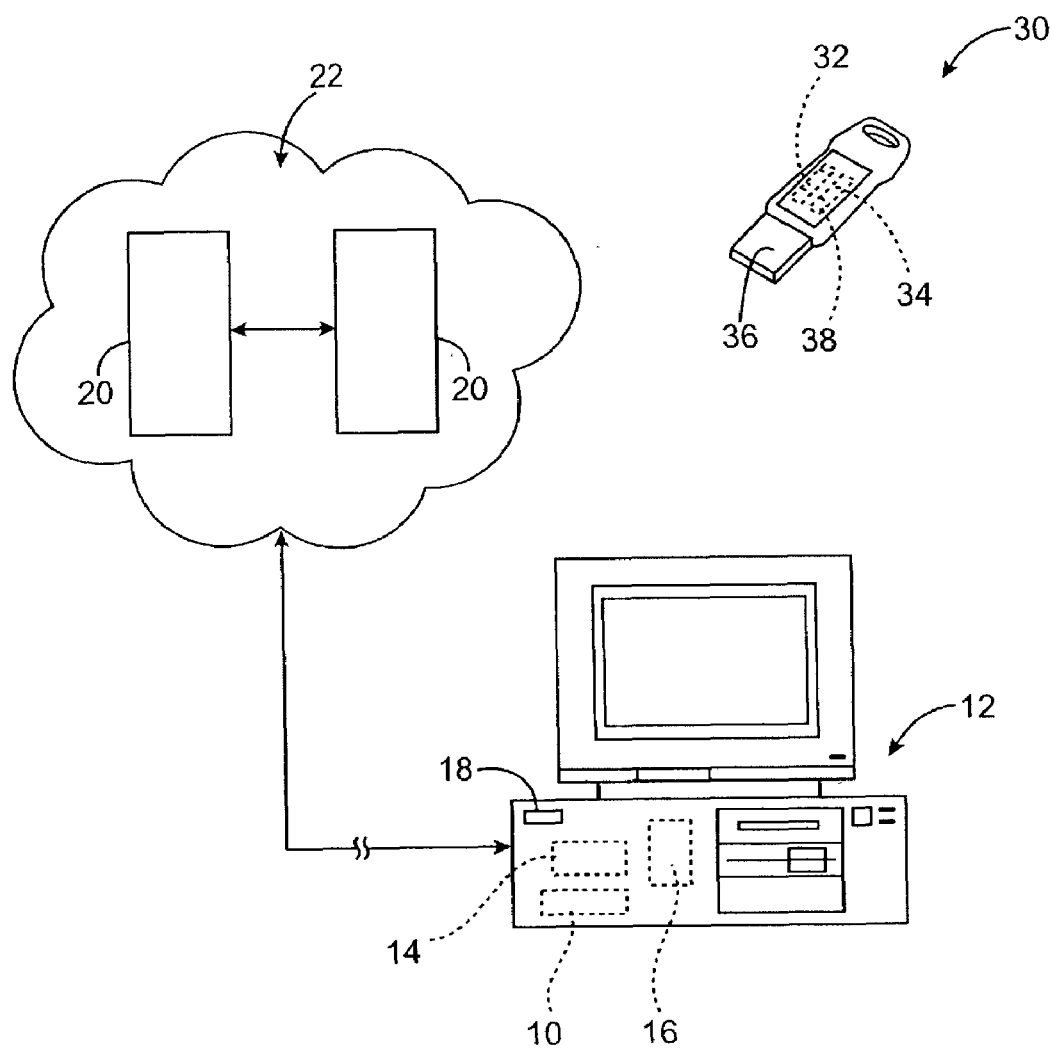
FIG. 1 is a schematic diagram of a computer coupled to a computer network and a token device of a preferred embodiment of the system and method of the present invention.

Referring now to FIG. 1 of the drawings, a preferred embodiment of the method of the present invention may be uploaded to a data storage device 10 of a computer 12, using known means. For example, the invented method may be provided in the form of a computer program and uploaded onto the computer 12 and stored on the storage device 10, as is well known.

Similarly, the method of the present invention may be installed on one or more servers 20 of a computer network, shown generally at 22. The computer network 22 may comprise a multiplicity of servers 20, several of which may be interconnected at any given time. The computer network 22 may comprise the Internet, or a company's Intranet, for example.

As referred to hereinafter, the term "computer" references any device capable of coupling to the computer network 22 and capable of receiving data for processing. The computer 12 may comprise any remote computing terminal which can provide a client access to the computer network 22, such as a well known ATM machine, for example. The computer 12 may be provided with a processor 14 for processing data and a memory 16 for storing data. The computer 12 may include a data port 18 to allow coupling of external devices, to the network 22, via the computer 12.

The computer 12 may be coupled to the network 22 via any known means. The computer 12 may be continuously coupled to the network 22, via a high bandwidth digital communications line, or may be intermittently coupled to the network 22, via a modem, for example.

A unique token device, or token, 30 is configured to be detachably coupled to the data port 18. The token 30 and data port 18 may be configured in any desired mutually compatible form factor which affords coupling and decoupling of the token 30 with the data port 18, and thus to the network 22 via the computer 12. For example, the data port 18 may comprise a known USB (Universal Serial Bus) port or similar data port.

The token 30 preferably includes an on-board processor 32 for processing data, a memory device 34 for storing data, and a coupling portion 36 for coupling the token 30 to the data port 18. The on-board processor 32 is preferably capable of processing 128-bit data. Additionally, the processor 32 is capable of running a data encryption/decryption algorithm, such as an Advanced Encryption Standard (AES) technology type data encryption/decryption algorithm.

The token's memory device, or memory, 34 may comprise a nonvolatile memory device that is configured to maintain data when power to the token 30 is removed. Preferably, the memory device 34 comprises a known flash memory device. Symmetric shared secrets are stored in the memory 34. A portion of the memory 34 may function as an identification (ID) pad 38. Different values may be stored in predetermined address locations in the ID pad 38 during manufacture of the token 30. The different values stored in predetermined address locations of the ID pad 38 comprise a portion of a shared secret.

One or more encryption/decryption keys may also be stored in the memory 34 of the token 30 during manufacture thereof. Each encryption/decryption key stored in the memory 34 may comprise a unique string of information and is the other portion of a shared secret. Since the symmetric shared secrets are embedded in the token's memory 34 during manufacture, the need for key exchanges between two parties over the network 22 is eliminated. Thus, MITM attacks are prevented, since there is no exchange and the MITM cannot steal encryption/decryption keys.

The encryption/decryption keys that are stored in the token 30 may depend upon certain factors. For example, if a client that is going to control the token 30 requests access to a particular server that requires a particular encryption/decryption key, then that key is stored in the memory 34. In addition, certain servers that do not generate a challenge may require another key, for example.

The token 30 may be distributed to a user, or client, using any known and applicable means. When a client receives the token 30, they must contact the distributor of the token 30, or other appropriate party, to verify that they possess the token 30. The client contacts the distributor and provides identifying information to the distributor, who verifies the client. At that time, the client may then generate their password or PIN. The password may be stored in the token's memory 34.

Figure 2:
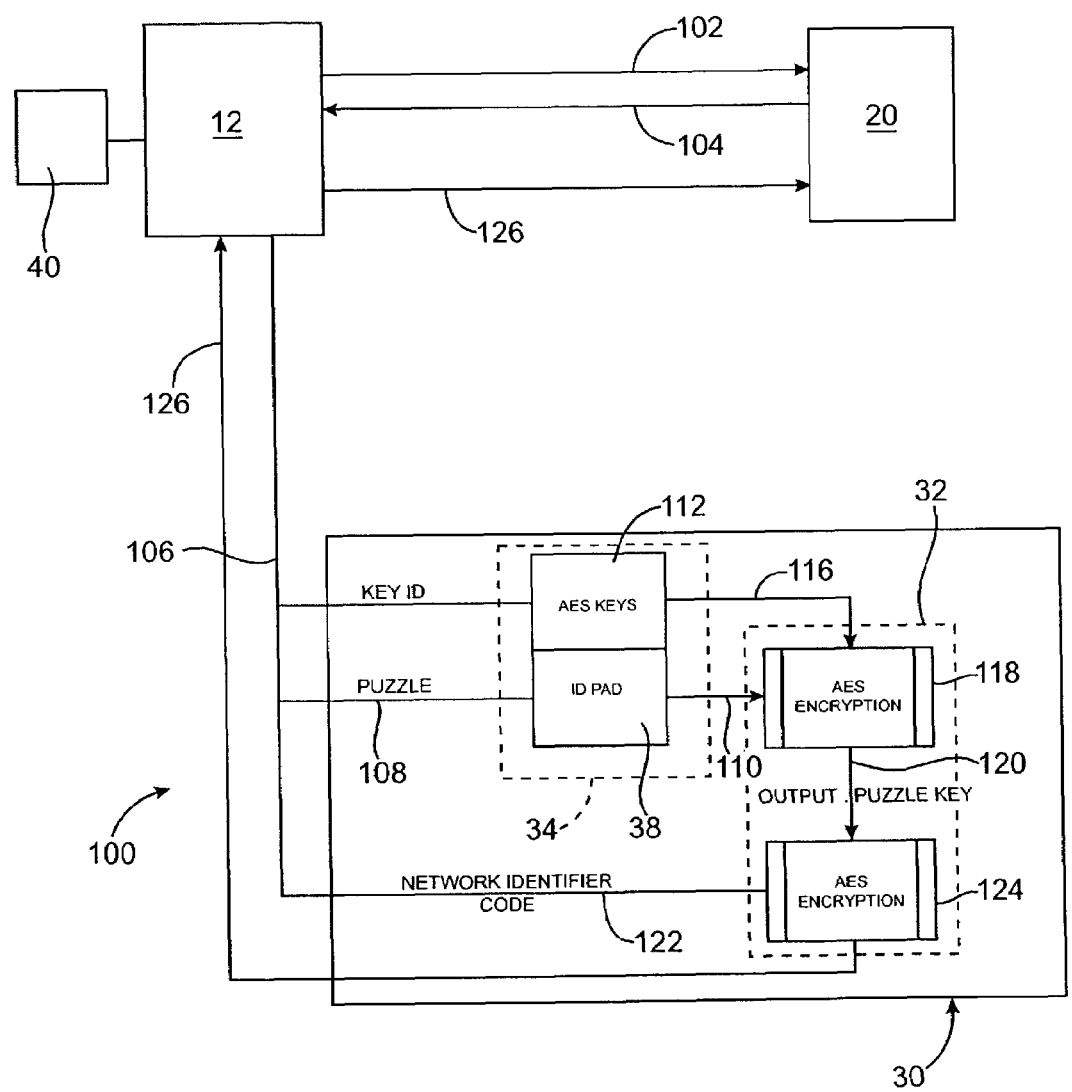
FIG. 2 is a flow chart showing data flow paths between a network server, a client, and a token device of the preferred embodiment of the system and method of the present invention.

Referring now to FIG. 2 and FIG. 1 of the drawings, there is shown generally at 100, a preferred method of the present invention. A client, shown schematically at 40, desires access to a network server 20, to activate a web page stored on the server 20, for example. As shown in the drawing Figure, the client 40 may embody any entity that possess the token 30, and which is capable of controlling the token 30 and computer 12.

The client 40 first couples a token device 30 (shown schematically in FIG. 2) that they control to a computer 12 running, or capable of running, the preferred embodiment of the method of the present invention. If the method is not running when the token 30 is coupled to the computer 12, the client 40 may invoke the method using any one of several well known means.

As shown along data flow path 102, the server 20 is queried to determine if the server 20 is going to grant the client 40 access to the network 22. The server's response to this query may be in the form of a challenge. The challenge may include a challenge puzzle, a key ID, and a network identifier code (session ID code). The challenge may be in the form of a 128-bit number. Upon generation of the challenge, the challenge is transmitted to the computer 12, as shown along data flow path 104. If the invented method determines that the server 20 is not going to generate a challenge, then the method utilizes the computer 12 to generate the challenge.

The challenge is then transmitted to the token 30 along data flow path 106. The method 100 may also transmit the client's password to the token 30, if the password is not stored on the token 30.

Once the token 30 receives the challenge and password, the challenge is processed by the token's processor 32. The challenge is decomposed to recover the challenge puzzle, key ID, and network identifier code. Once the challenge puzzle is obtained, the challenge puzzle is sent to the ID pad 38, as shown on data flow path 108. The challenge puzzle is mapped to the ID pad 38 stored in the token's memory 34. The challenge puzzle may function as a set of instructions for accessing selected data address locations in the ID pad 38 for retrieving a portion of a selected shared secret from memory 34. The values stored in the selected address locations are retrieved and fed into the token's processor 32 for processing, shown on data flow path 110.

Similarly, the key ID identifies which particular encryption/decryption key stored in memory 34 corresponds to the remaining portion of the selected shared secret. The encryption/decryption key identified by the key ID is then retrieved from memory 34 and fed into the processor 32 for processing, as shown along data flow path 116. The encryption/decryption keys may be stored in memory 34 at a location 112 other than the ID pad 38.

The token's processor 32 may be running a data encryption/decryption algorithm. Preferably, the token's processor 32 may be running an Advanced Encryption Standard (AES) technology type data encryption/decryption algorithm. The processor 32 the two portions of the shared secret, i.e. the values stored in the selected address locations of the ID pad 38 and the selected encryption/decryption key, performs a first round of data encryption as shown in process block 118. The processor 32 then generates an encrypted puzzle key, shown in data flow path 120.

Upon generation of the encrypted puzzle key, the network identifier code is fed into the token's processor 32, shown along data flow path 122. The encrypted puzzle key is fed back into the processor 32 and a second round of encryption is performed in process block 124. The second round of encryption generates an encrypted response to the challenge, or one-time password (OTP). Since the OTP is used only once, replay attacks may be prevented and decryption thereof may be inhibited. The OTP may be a 128-bit number.

As shown on data flow path 126, the OTP is then transmitted to the network server 20, via the computer 12. Once the network server 20 receives the OTP, the server 20 generates its response using the same process that the token 30 used to generate the OTP. The server 20 then compares its response to the OTP to determine if a match exists. If they match, then the client 40 is authenticated and is granted access to the network 22. If they do not match, then the client 40 is denied access to the network 22 by the server 20.

Alternatively, if the method 100 generated the challenge, then the method-generated challenge and OTP are both sent to the network server 20. The sever 20 generates its response using the challenge generated by the method 100. The server 20 then compares the two responses to determine if a match exists.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for securing a session over a network, comprising:
   (a) coupling a client computer to a server in a session over a network in order to gain access to a secured webpage;
   (b) coupling a unique token device to the client computer, said token device including a processor and a memory, the processor adapted to run a data encryption/decryption algorithm and the memory for storing shared symmetric keys that eliminate a need for key exchanges between parties in a secure network session;
   (c) querying said server for access over the network from said client computer;
   (d) generating a challenge from said server responsive to the query that includes a challenge puzzle, an encryption/decryption key ID, and a session ID code, wherein said challenge puzzle and encryption/decryption key ID determine which two particular said shared keys are to be sent to said processor in the unique token device;
(e) transmitting the challenge to the unique token device over the network for processing with said encryption/decryption program;
(g) generating an encryption key in said token device by decomposing the challenge to recover said challenge puzzle, encryption/decryption key ID, and session ID code to produce an encrypted puzzle key from said two shared keys;
(g) generating a one-time-password (OTP) response in said token device from said session ID code and said encrypted puzzle key;
(h) transmitting the OTP response from said client computer to the server over the network;
(i) comparing the OTP response to a server-generated response which was generated with the same process that the client token device should have used to generate the OTP response and determining if the OTP response and the server-generated response match;
(j) if the OTP response and the server-generated response match, then granting the client computer access to the server over the network; and
(k) if the OTP response and the server-generated response do not match, then denying the client computer access to the server over the network.

2. The method of claim 1 wherein a new challenge is generated by the server for every query of the server.

3. The method of claim 1 wherein a new session ID code is generated by the server for every query of the server.

4. The method of claim 1 wherein either one of the queried server and the client computer generates the challenge.

5. The method of claim 1 wherein the token device performs a first round of encryption to generate the encryption key, the first round of encryption comprising the following steps:
retrieving information from addresses in an ID pad region of the token device memory determined by the challenge puzzle;
retrieving an encryption/decryption key from memory determined by the key ID; and
feeding the encryption/decryption key and information retrieved from the ID pad region into said encryption/decryption program running on the processor to generate the encryption key.

6. The method of claim 5 wherein the token device performs a second round of encryption to generate the OTP response, the second round of encryption comprising the following steps:
feeding the encryption key and the session ID code into the encryption/decryption program running on the processor to generate the response.

7. A system for securing information obtained over a network, the system comprising:
a token device adapted to be coupled to the computer, said token device including a processor and a memory, the processor adapted to run a data encryption/decryption algorithm and the memory for storing shared symmetric keys that eliminate a need for key exchanges between parties in a secure network session;
wherein if a client requests access to a server then a query is sent to the server, a challenge including a challenge puzzle, an encryption/decryption key ID, and a session ID code that determine which two particular said symmetric shared keys are to be sent to said processor in the token device responsive to the query is generated and transmitted to the token, the token performing a first round of encryption to produce an encrypted puzzle key from said two symmetric shared keys and performing a second round of encryption to generate a one-time password (OTP) from said encrypted puzzle key and said session ID code, the one-time-password transmitted to the server to compare the one-time password to a server-generated response to determine if the one-time password and the server-generated response match;
whereby if the one-time password and the server-generated response match, then the client is granted access to the network and if the one-time password and the server-generated response do not match, then the client is denied access to the network.

* * * * *